No. 703,367. Patented July 1, 1902.
J. I. BARNES.
ANIMAL POKE.
(Application filed Nov. 28, 1900.)
(No Model.)
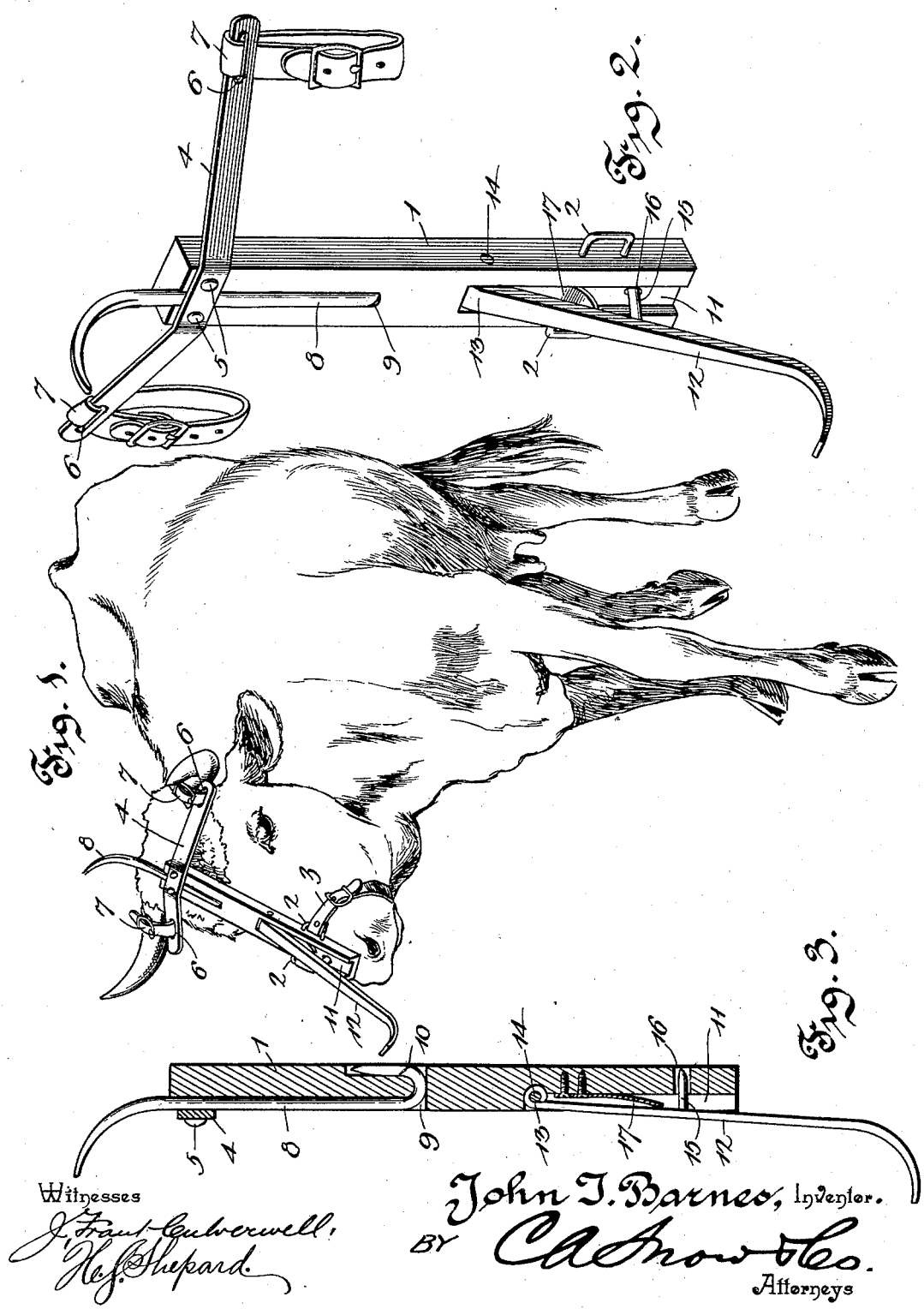

UNITED STATES PATENT OFFICE.

JOHN I. BARNES, OF BLOOMING GROVE, TEXAS.

ANIMAL-POKE.

SPECIFICATION forming part of Letters Patent No. 703,367, dated July 1, 1902.

Application filed November 28, 1900. Serial No. 38,030. (No model.)

*To all whom it may concern:*

Be it known that I, JOHN I. BARNES, a citizen of the United States, residing at Blooming Grove, in the county of Navarro and State of Texas, have invented a new and useful Animal-Poke, of which the following is a specification.

This invention relates to animal-pokes, and has for its object to provide an improved device of this character which is arranged for convenient application to an animal, so as not to interfere with the grazing and drinking thereof, and will effectually prevent the animal from destroying fences and also from pushing and fighting other stock.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view illustrating the application of the present device. Fig. 2 is a perspective view of an animal-poke constructed in accordance with the present invention. Fig. 3 is a central longitudinal sectional view thereof.

Like characters of reference designate corresponding parts in all of the figures of the drawings.

Referring to the drawings, 1 designates a wooden bar forming the body or face piece of the poke and is designed to fit against the bridge of the face of an animal, as shown in Fig. 1, and extends from the nostrils upwardly to a suitable point adjacent to the horns of the animal. Adjacent to the lower end of the face-bar are the opposite staples or eyes 2, which project from the opposite edges of the bar and are designed for connection with the opposite ends of an adjustable jaw-embracing strap 3, which holds the lower end of the device in place. At the opposite upper end of the bar there is a metal cross-bar 4, which is secured to the front side of the face-bar by means of suitable fastenings 5 and has its opposite portions extended at opposite sides of the face-bar and bent or inclined rearwardly, so as to lie against the head of the animal and prevent the device from being twisted. The outer extremity of each arm formed by the cross bar or head is provided with a longitudinal slot or opening 6 for the loose reception of an adjustable looped strap 7, which is designed to tightly embrace the adjacent horn of the animal, as shown. By this arrangement the face-bar is fixed at its lower end to the jaws of the animal, while its upper end is connected to the horns thereof, and the cross-bar rests against the animal's head, so as to render the device rigid. It will be understood that the jaw-embracing strap is sufficiently loose to permit of the animal grazing and drinking, and for this reason the cross head or bar is employed to prevent twisting of the device.

A rigid guard 8 projects above the upper end of the face-bar and is formed by a metal rod which is seated in a groove in the front side of the face-bar and has its lower end passed rearwardly through a perforation 9 in the bar and then upset or bent into a notch or groove, as indicated at 10, so as to render the rear side of the bar free from projections which would rub against the animal and worry the same. Moreover, the intermediate portion of the cross-bar extends across the upper portion of the rod and thereby serves as a fastening therefor. The upper extremity of this guard-rod is preferably curved or bowed forwardly and is designed to project above the animal's head, so as to prevent the same being thrust between the bars or runner-wires of a fence.

A longitudinal groove 11 is formed in the lower portion of the front side of the face-bar and opens outwardly through the lower end thereof and is designed for the reception of a swinging guard 12, which has its upper end provided with an eye 13, located within the upper end of the groove and connected to the bar by means of a transverse pivot-pin 14. This swinging guard is formed from a single bar of metal, which projects a suitable distance below the face-bar and has its lower free extremity bowed forwardly and upwardly, so that should it strike the ground it will swing forwardly, thereby preventing the animal from stumbling and also facilitating the grazing thereof. A pointed prod or spur 15 projects rearwardly from an intermediate portion of the back of the swinging guard and plays loosely through a perforation 16 in the face-bar, the guard and the pin or spur being normally and yieldingly held outwardly from the face-bar by means of a suitable spring 17, secured to the back of the groove and bearing against the back of the guard. By this arrangement the point of the pin or spur is normally held within the perforation in the face-bar and out of contact with the animal; but should the latter press the guard against a fence or another animal said guard will be forced inwardly or rearwardly, thereby carrying the prod or spur through the face-bar and into contact with the nostrils of the animal, so as to prod or stick the latter.

What is claimed is—

An animal-poke comprising a face-bar having opposite terminal longitudinal grooves formed in the outer surface thereof and extending outward through the respective ends of the bar, an upstanding forwardly-curved fixed guard seated in the upper groove flush with the outer surface of the bar, the inner end of the guard being passed through the bar and rebent into a socket in the back thereof and flush with its inner surface, a rigid cross-bar disposed near the upper terminal of the face-bar and secured thereto at opposite sides of the said guard serving thereby to clamp the same in place, the terminals of the bar being bent rearward to lie against the head of the animal, horn-embracing loops connected to the outer ends of the cross-bar, a swinging spring-pressed guard hinged within the lower groove and provided with a rearwardly-projecting prod working in an opening in the face-bar and with an outward-curved extremity, the two guards being braced by the opposite side walls of the respective grooves, and a jaw-embracing strap secured to the face-bar near its lower end, substantially as and for the purpose specified.

In testimony that I claim the foregoing as my own I have hereto affixed my signature in the presence of two witnesses.

JOHN I. BARNES.

Witnesses:
  B. F. HARTZELL,
  R. C. LOYD.